(12) United States Patent
Chang et al.

(10) Patent No.: US 11,238,633 B2
(45) Date of Patent: Feb. 1, 2022

(54) METHOD AND APPARATUS FOR BEAUTIFYING FACE, ELECTRONIC DEVICE, AND STORAGE MEDIUM

(71) Applicant: Beijing Baidu Netcom Science and Technology Co., Ltd., Beijing (CN)

(72) Inventors: Yuanzhang Chang, Beijing (CN); Xiaoxin Ma, Beijing (CN); Hui Zhao, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/192,106

(22) Filed: Mar. 4, 2021

(65) Prior Publication Data

US 2021/0319607 A1    Oct. 14, 2021

(30) Foreign Application Priority Data

Apr. 9, 2020   (CN) .......................... 202010274413.4

(51) Int. Cl.
  *G06T 11/60*   (2006.01)
  *G06K 9/00*   (2006.01)
  *G06T 7/73*   (2017.01)

(52) U.S. Cl.
  CPC .......... *G06T 11/60* (2013.01); *G06K 9/00281* (2013.01); *G06T 7/73* (2017.01); *G06T 2207/10016* (2013.01); *G06T 2207/30201* (2013.01)

(58) Field of Classification Search
  CPC .. G06T 7/73; G06T 2207/30201; G06T 11/60
  See application file for complete search history.

(56) References Cited

U.S. PATENT DOCUMENTS

| | | | |
|---|---|---|---|
| 7,454,039 B2* | 11/2008 | Tu ....................... | G06K 9/00248 382/115 |
| 10,949,648 B1* | 3/2021 | Cao .................... | G06K 9/00315 |
| 2007/0019882 A1* | 1/2007 | Tanaka ................... | G06T 17/20 382/276 |
| 2011/0115786 A1* | 5/2011 | Mochizuki ............ | G06T 11/001 345/419 |
| 2015/0221069 A1* | 8/2015 | Shaburova .............. | G06T 11/60 382/167 |

(Continued)

*Primary Examiner* — Phi Hoang
(74) *Attorney, Agent, or Firm* — Nixon Peabody LLP

(57) ABSTRACT

A method and apparatus for beautifying a face are provided. The method may include: extracting a first predetermined number of key points from a current face image captured in advance, and expanding a second predetermined number of key points in the current face image; extracting each preset key point from a triangulation template with a preset functionality, and extracting a target key point corresponding to each preset key point from a set of key points consisting of the first predetermined number of key points and the second predetermined number of key points; extracting each preset triangulation grid from the triangulation template based on each preset key point, and constructing a target triangulation grid corresponding to each preset triangulation grid in the current face image based on each target key point; and performing beautifying with the preset functionality on the current face image on each target triangulation grid.

18 Claims, 8 Drawing Sheets

(56) References Cited

U.S. PATENT DOCUMENTS

| | | | |
|---|---|---|---|
| 2016/0022014 A1* | 1/2016 | Ajiki | A45D 44/005 |
| | | | 132/200 |
| 2019/0122404 A1* | 4/2019 | Freeman | G06T 7/251 |
| 2019/0228556 A1* | 7/2019 | Wang | G06T 13/40 |
| 2020/0034996 A1* | 1/2020 | Qian | G06K 9/22 |
| 2020/0082595 A1* | 3/2020 | Okada | G06T 15/80 |
| 2020/0234034 A1* | 7/2020 | Savchenkov | G06N 3/04 |
| 2021/0279956 A1* | 9/2021 | Chandran | G06T 13/40 |

* cited by examiner

METHOD AND APPARATUS FOR BEAUTIFYING FACE, ELECTRONIC DEVICE, AND STORAGE MEDIUM

CROSS-REFERENCE TO RELATED APPLICATIONS

This application claims priority to Chinese Patent Application No. 202010274413.4, filed on Apr. 9, 2020, titled "Method and apparatus for beautifying face, electronic device, and storage medium," which is hereby incorporated by reference in its entirety.

TECHNICAL FIELD

The present disclosure relates to the field of image processing technology, further relates to a computer vision technology, and particularly relates to a method and apparatus for beautifying a face, an electronic device, and a storage medium.

BACKGROUND

Currently, many short video and live video applications are widely used by more and more users. Among these applications, interactive applications related to face beautification account for a large proportion, such as face shaping, face makeup, face whitening and skin retouching.

SUMMARY

In view of the above, embodiments of the present disclosure provide a method and apparatus for beautifying a face, an electronic device, and a storage medium.

According to a first aspect, an embodiment of the present disclosure provides a method for beautifying a face. The method includes: extracting a first predetermined number of key points from a current face image captured in advance, and expanding a second predetermined number of key points in the current face image based on the first predetermined number of key points; extracting each preset key point from a triangulation template with a preset functionality, and extracting a target key point corresponding to each preset key point from a set of key points consisting of the first predetermined number of key points and the second predetermined number of key points; extracting each preset triangulation grid from the triangulation template based on each preset key point, and constructing a target triangulation grid corresponding to each preset triangulation grid in the current face image based on each target key point; and performing beautifying with the preset functionality on the current face image on each target triangulation grid.

In an embodiment, the preset functionality at least includes: a shaping functionality, a makeup functionality, and a whitening and skin retouching functionality; and the makeup functionality includes: a whole face makeup functionality, an upper half face makeup functionality, and a lower half face makeup functionality.

In an embodiment, extracting the target key point corresponding to each preset key point from the set of key points consisting of the first predetermined number of key points and the second predetermined number of key points includes: extracting a preset key point from all preset key points in the triangulation template as a current preset key point; and extracting, according to a preset number of the current preset key point, a key point with a same number as the preset number from the set of key points, using the key point extracted from the set of key points as a target key point corresponding to the current preset key point, and repeatedly executing the operation of extracting the current preset key point, until target key points corresponding to respective preset key points are extracted from the set of key points.

In an embodiment, constructing the target triangulation grid corresponding to each preset triangulation grid in the current face image based on each target key point includes: extracting a preset triangulation grid from all preset triangulation grids in the triangulation template as a current preset triangulation grid; where the current preset triangulation grid is formed by connecting every two of a current first preset key point, a current second preset key point and a current third preset key point; and according to a preset first number of the current first preset key point, a preset second number of the current second preset key point and a preset third number of the current third preset key point, extracting a first target key point with a same number as the first number, a second target key point with a same number as the second number and a third target key point with a same number as the third number from all target key points, connecting every two of the first target key point, the second target key point and the third target key point to form a target triangulation grid corresponding to the current preset triangulation grid, and repeatedly executing the operation of extracting the current preset triangulation grid, until target triangulation grids corresponding to respective preset triangulation grids are constructed in the current face image.

In an embodiment, performing beautifying with the preset functionality on the current face image on each target triangulation grid includes: in response to the preset functionality being the shaping functionality, determining a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and performing beautifying with the shaping functionality on the current face image on each target triangulation grid according to the first position difference, the second position difference and the third position difference between the preset triangulation grids and the target triangulation grids corresponding to the preset triangulation grids.

In an embodiment, performing beautifying with the preset functionality on the current face image on each target triangulation grid includes: in response to the preset functionality being the makeup functionality, acquiring a makeup material corresponding to a vertex of each target triangulation grid, and performing beautifying with the makeup functionality on the current face image on each target triangulation grid, according to the makeup material corresponding to the vertex of each target triangulation grid, or in response to the preset functionality being the whitening and skin retouching functionality, performing image space brightening on each target triangulation grid, extracting each pixel from each target triangulation grid, and filtering each extracted pixel.

According to a second aspect, an embodiment of the present disclosure provides an apparatus for beautifying a face, the apparatus including: a first extraction module, a second extraction module, a construction module, and a beautification module. The first extraction module is configured to extract a first predetermined number of key points from a current face image captured in advance, and expand a second predetermined number of key points in the current face image based on the first predetermined number of key points; the second extraction module is configured to extract each preset key point from a triangulation template with a preset functionality, and extract a target key point corresponding to each preset key point from a set of key points consisting of the first predetermined number of key points and the second predetermined number of key points; the construction module is configured to extract each preset triangulation grid from the triangulation template based on each preset key point, and construct a target triangulation grid corresponding to each preset triangulation grid in the current face image based on each target key point; and the beautification module is configured to perform beautifying with the preset functionality on the current face image on each target triangulation grid.

In an embodiment, the preset functionality at least includes: a shaping functionality, a makeup functionality, and a whitening and skin retouching functionality; and the makeup functionality includes: a whole face makeup functionality, an upper half face makeup functionality, and a lower half face makeup functionality.

In an embodiment, the second extraction module is specifically configured to extract a preset key point from all preset key points in the triangulation template as a current preset key point; and extract, according to a preset number of the current preset key point, a key point with a same number as the preset number from the set of key points, use the key point extracted from the set of key points as a target key point corresponding to the current preset key point, and repeatedly execute the operation of extracting the current preset key point, until target key points corresponding to respective preset key points are extracted from the set of key points.

In an embodiment, the construction module is specifically configured to: extract a preset triangulation grid from all preset triangulation grids in the triangulation template as a current preset triangulation grid, where the current preset triangulation grid is formed by connecting every two of a current first preset key point, a current second preset key point and a current third preset key point; and according to a preset first number of the current first preset key point, a preset second number of the current second preset key point and a preset third number of the current third preset key point, extract a first target key point with a same number as the first number, a second target key point with a same number as the second number and a third target key point with a same number as the third number from all the target key points, connect every two of the first target key point, the second target key point and the third target key point to form a target triangulation grid corresponding to the current preset triangulation grid, and repeatedly execute the operation of extracting the current preset triangulation grid, until the target triangulation grids corresponding to the respective preset triangulation grids are constructed in the current face image.

In an embodiment, the beautification module is specifically configured to: determine, in response to the preset functionality being the shaping functionality, a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and perform beautifying with the shaping functionality on the current face image on each target triangulation grid according to the first position difference, the second position difference and the third position difference between the preset triangulation grids and the target triangulation grids corresponding to the preset triangulation grids.

In an embodiment, the beautification module is specifically configured to acquire, in response to the preset functionality being the makeup functionality, a makeup material corresponding to a vertex of each target triangulation grid, and perform beautifying with the makeup functionality on the current face image on each target triangulation grid according to the makeup material corresponding to the vertex of each target triangulation grid; or perform, in response to the preset functionality being the whitening and skin retouching functionality, image space brightening on each target triangulation grid, extract each pixel from each target triangulation grid, and filter each extracted pixel.

According to a third aspect, an embodiment of the present disclosure provides an electronic device. Including: at least one processor; and a memory communicatively connected with the at least one processor. The memory stores instructions executable by the at least one processor, and the instructions, when executed by the at least one processor, cause the at least one processor to execute the method for beautifying a face according to any embodiment of the method.

According to a fourth aspect, an embodiment of the present disclosure provides a storage medium storing computer instructions. The computer instructions, when executed by a processor, implement the method for beautifying a face according to any embodiment of the method.

Other effects of the above embodiments will be described hereinafter in connection with specific embodiments.

BRIEF DESCRIPTION OF THE DRAWINGS

The drawings are used to better understand the solution and do not constitute limitations to the present disclosure.

DETAILED DESCRIPTION OF EMBODIMENTS

Example embodiments of the present disclosure will be described below in combination with the accompanying drawings, which include various details of embodiments of the present disclosure to facilitate understanding and should be regarded as an example. Therefore, it should be appreciated by those of ordinary skill in the art that various changes and modifications can be made to the embodiments described here without departing from the scope and spirit of the present disclosure. Likewise, for clarity and conciseness, descriptions of well-known functions and structures are omitted in the following description.

Embodiment 1

Figure 1:
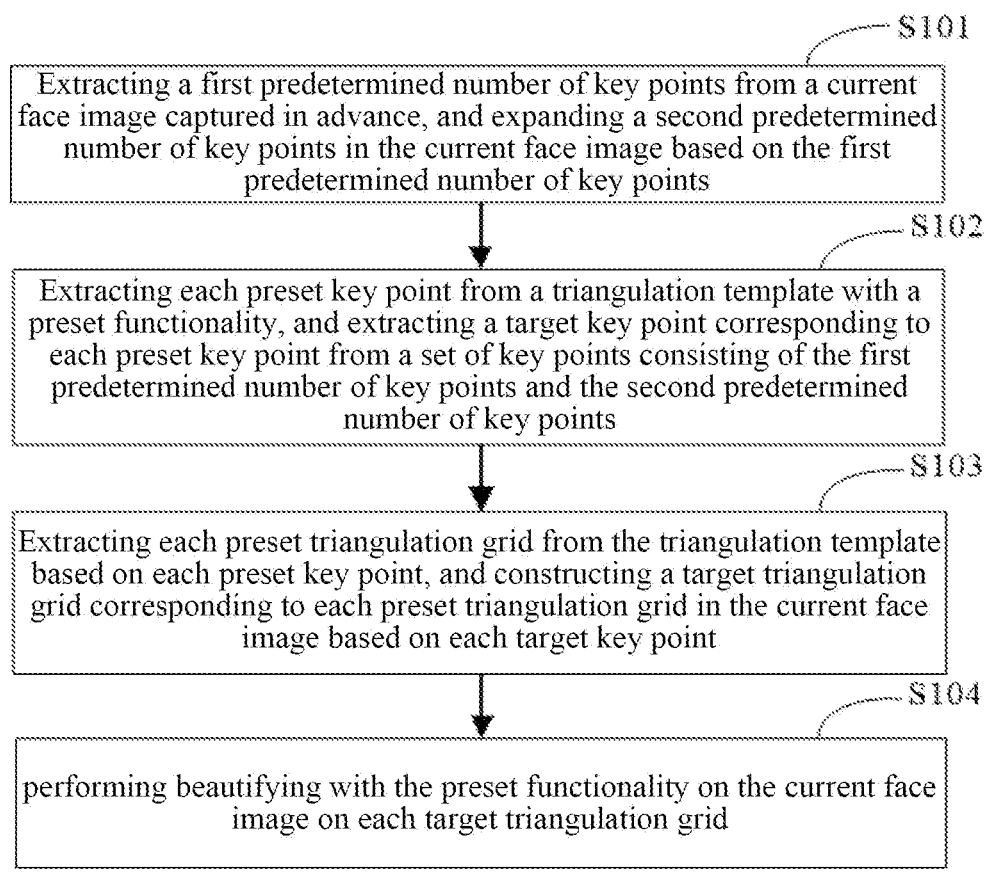
FIG. 1 is a schematic flowchart of a method for beautifying a face according to Embodiment 1 of the present disclosure.

FIG. 1 is a schematic flowchart of a method for beautifying a face according to Embodiment 1 of the present disclosure. The method may be executed by an apparatus for beautifying a face or an electronic device, the apparatus or the electronic device may be implemented by means of software and/or hardware, and the apparatus or the electronic device may be integrated in any intelligent device with a network communication functionality. As shown in FIG. 1, the method for beautifying a face provided by embodiments of the present disclosure relates to the technical fields of image processing and image rendering, and further relates to technologies such as computer vision and computer graphics. The method may include the following steps.

S101, a first predetermined number of key points are extracted from a current face image captured in advance, and a second predetermined number of key points are expanded in the current face image based on the first predetermined number of key points.

In a specific embodiment of the present disclosure, the electronic device may extract the first predetermined number of key points from the current face image captured in advance, and expand the second predetermined number of key points in the current face image based on the first predetermined number of key points. The first predetermined number and the second predetermined number in the embodiment of the present disclosure may be preset. For example, the first predetermined number may be 190, and the second predetermined number may be 306. Then, a set of key points consisting of the first predetermined number of key points and the second predetermined number of key points includes 496 key points. Specifically, the electronic device may capture the face image in advance, and the face image may be a photo or a frame of picture in a video. The photo or video here may be captured by a user through an image capture device such as a camera, or may be a photo or video pre-stored in a storage device. When a plurality of faces appears in the video, the faces may be respectively beautified according to the embodiment of the present disclosure. In this step, for the captured photo, the electronic device may extract the first predetermined number of key points by using a preset algorithm, and the preset algorithm may be any machine learning algorithm, such as a deep learning algorithm. For the captured video, the electronic device needs to process all frames or key frames of the video one by one. Optionally, in order to achieve the continuity of the video after the processing effect is achieved, the key points in each frame should be ensured from abrupt effects such as jitter and discontinuity as much as possible, and the extracted key points need to be smoothed between frames by means of an algorithm. As an example, in the process of smoothing, key points in an adjacent frame or multiple adjacent frames in front of each frame may be subjected to a filtering algorithm, such as Kalman filtering and Laplacian smoothing, which may ensure that the obtained key points are relatively smooth, and the subsequent expanded key points and triangulation results are also smooth and continuous.

S102, each preset key point is extracted from a triangulation template with a preset functionality, and a target key point corresponding to each preset key point is extracted from a set of key points consisting of the first predetermined number of key points and the second predetermined number of key points.

In a specific embodiment of the present disclosure, the electronic device may extract each preset key point from the triangulation template with the preset functionality, and extract the target key point corresponding to each preset key point from the set of key points consisting of the first predetermined number of key points and the second predetermined number of key points. Specifically, the electronic device may extract a preset key point from all the preset key points in the triangulation template as the current preset key point; and the electronic device may extract, according to a preset number of the current preset key point, a key point with the same number as the preset number from the set of key points, use the key point extracted from the set of key points as a target key point corresponding to the current preset key point, and repeatedly execute the operation of extracting the current preset key point, until the target key points corresponding to the respective preset key points are extracted from the set of key points. The embodiment of the present disclosure may preset a plurality of triangulation templates, and each triangulation template corresponds to a different beautifying functionality. For example, the shaping functionality corresponds to a triangulation template; the makeup functionality corresponds to several triangulation templates; the whitening and skin retouching functionality corresponds to a triangulation template; each triangulation template may include all 496 key points of a face, and may also include some of the 496 key points; the position of each key point is semantically fixed on the face, for example, a nose tip point is always located at a nose tip of the face in the image; and each key point is configured with a corresponding unique number, for example, the unique number corresponding to the nose tip point is 115, and the numbers corresponding to center points of left and right pupils are 21 and 38.

S103, each preset triangulation grid is extracted from the triangulation template based on each preset key point, and a target triangulation grid corresponding to each preset triangulation grid is constructed in the current face image based on each target key point.

In a specific embodiment of the present disclosure, the electronic device may extract each preset triangulation grid from the triangulation template based on each preset key point, and construct the target triangulation grid corresponding to each preset triangulation grid in the current face image based on each target key point. Specifically, the electronic device may first extract a preset triangulation grid from all the preset triangulation grids in the triangulation template as the current preset triangulation grid, where the current preset triangulation grid is formed by connecting every two of the current first preset key point, the current second preset key point and the current third preset key point; and then according to the preset first number of the current first preset key point, the preset second number of the current second preset key point and the preset third number of the current third preset key point, the electronic device may extract a first target key point with the same number as the first number, a second target key point with the same number as the second number and a third target key point with the same number as the third number from all the target key points, connect every two of the first target key point, the second target key point and the third target key point to form a target triangulation grid corresponding to the current preset triangulation grid, and repeatedly execute the operation of extracting the current preset triangulation grid, until the target triangulation grids corresponding to the respective preset triangulation grids are constructed in the current face image.

S104, the current face image is beautified with the preset functionality on each target triangulation grid.

The above embodiment has the following advantages or beneficial effects: the above embodiment may preset a plurality of triangulation templates with different beautifying functionalities, use the triangulation templates corresponding to the beautifying functionalities for the different beautifying functionalities, construct target triangulation grids corresponding to the triangulation grids in the current face image, and perform beautifying with the corresponding functionality on the current face image on the target triangulation grids, thereby achieving the goals of improving the beautifying effect and improving the processing speed. In the existing method for beautifying a face, different beautifying functionalities are achieved by different technical means, so that different processing programs need to be installed and executed respectively, which causes the problem of slow processing speed; and the existing method for beautifying a face cannot achieve personalized beautifying effects. By the technical means of presetting the triangulation template, the present disclosure overcomes the technical problems in the existing art that personalized beautifying effects cannot be achieved and the processing speed is slow, thereby achieving the personalized beautifying effects and improving the processing speed.

In a specific embodiment of the present disclosure, the electronic device may perform beautifying with the preset functionality on the current face image on each target triangulation grid. Specifically, if the preset functionality is a shaping functionality, the electronic device may first determine a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and then the electronic device may perform beautifying with the shaping functionality on the current face image on each target triangulation grid according to the first position difference, the second position difference and the third position difference between the preset triangulation grids and the target triangulation grids corresponding to the preset triangulation grids. If the preset functionality is a makeup functionality, the electronic device may acquire a makeup material corresponding to a vertex of each target triangulation grid; and then perform beautifying with the makeup functionality, according to the makeup material corresponding to the vertex of each target triangulation grid, on the current face image on each target triangulation grid. If the preset functionality is a whitening and skin retouching functionality, the electronic device may perform image space brightening on each target triangulation grid, extract each pixel from each target triangulation grid, and filter each extracted pixel. For example, for each pixel, the electronic device detects whether the pixel is a pixel in a high-frequency range or a pixel in a low-frequency range; in response to the pixel being a pixel in the high-frequency range, the electronic device may perform processing by means of filtration corresponding to the pixel in the high-frequency range; and in response to the pixel being a pixel in the low-frequency range, the electronic device may perform processing by means of filtration corresponding to the pixel in the low-frequency range. The high frequency corresponds to an edge area of the image, and the low frequency corresponds to a non-edge area of the image. For the whitening and skin retouching functionality, the face area may be accurately covered, and then edge-preserving filtration is performed on the face area, thereby eliminating the output of the face area by a face segmentation algorithm and effectively improving the running speed.

In a specific embodiment of the present disclosure, the preset functionality may at least include: a shaping functionality, a makeup functionality, and a whitening and skin retouching functionality; and further, the makeup functionality includes: a whole face makeup functionality, an upper half face makeup functionality, and a lower half face makeup functionality. Therefore, the triangulation template with the preset functionality may at least include: a triangulation template with a shaping functionality, a triangulation template with a makeup functionality, and a triangulation template with a whitening and skin retouching functionality; and further, the triangulation template with the makeup functionality may include: a triangulation template with a whole face makeup functionality, a triangulation template with an upper half face makeup functionality, and a triangulation template with a lower half face makeup functionality. Specifically, the triangulation template with the whole face makeup functionality may be a triangulation template with a blush functionality; the triangulation template with the upper half face makeup functionality may be a triangulation template with a pupil makeup functionality or a triangulation template with an eyebrow makeup functionality; and the triangulation template with the lower half face makeup functionality may be a triangulation template with a lip makeup functionality.

The above embodiment has the following advantages or beneficial effects: the above embodiment may set a corresponding triangulation template for a different beautifying functionality, then use the triangulation template corresponding to the beautifying functionality, construct target triangulation grids corresponding to the triangulation grids in the current face image, and perform beautifying with the corresponding functionality on the current face image on the target triangulation grids, thereby achieving the goals of improving the beautifying effect and improving the processing speed.

Figure 2A:
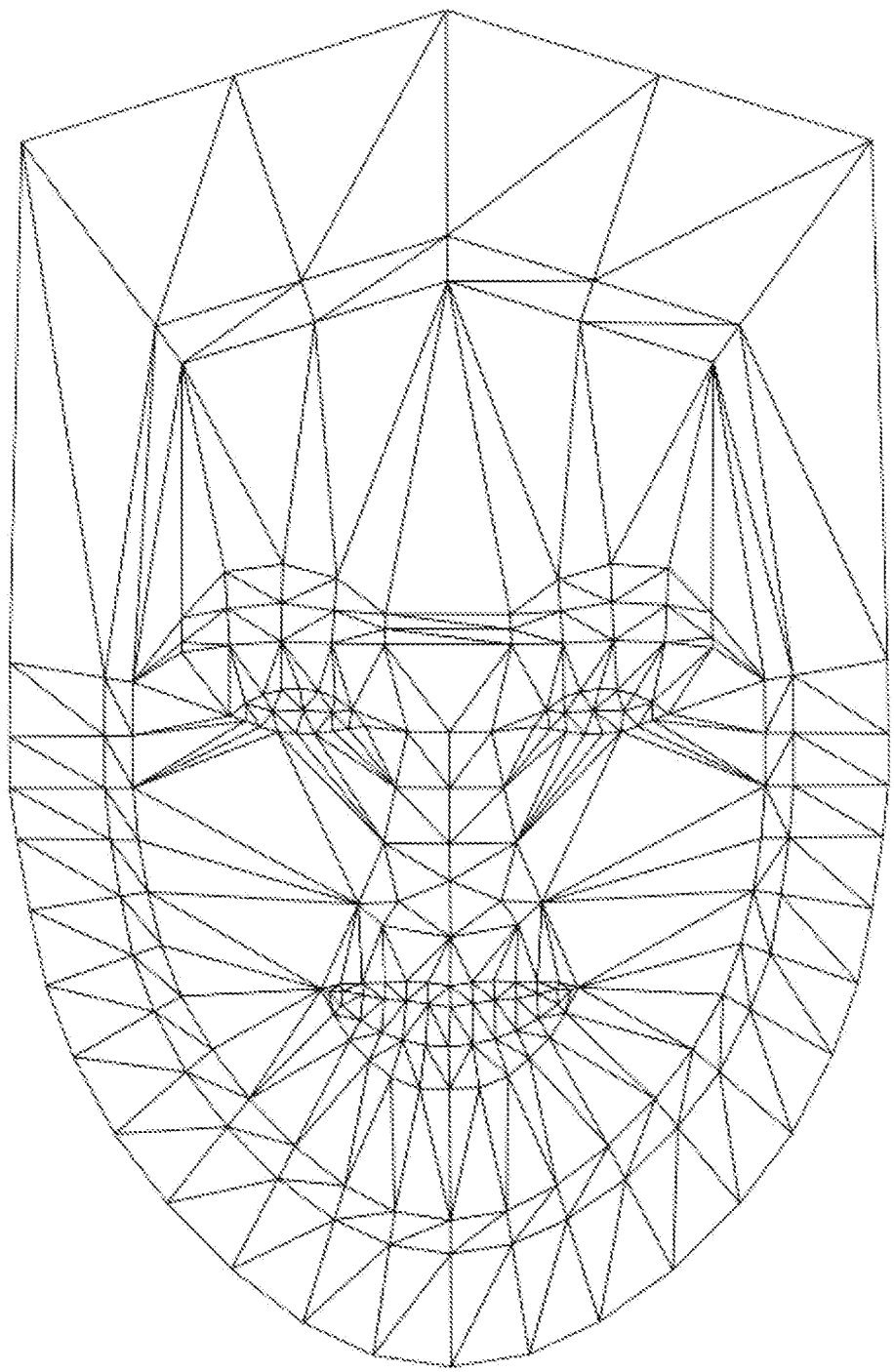
FIG. 2A is a schematic structural diagram of a triangulation template with a shaping functionality according to Embodiment 1 of the present disclosure.

FIG. 2A is a schematic structural diagram of a triangulation template with a shaping functionality according to Embodiment 1 of the present disclosure. As shown in FIG. 2A, in the triangulation template with the shaping functionality, the purpose of expanding a contour formed by cheek points by two more circles is to ensure that the influence of face shape adjustment on an image background is as small as possible. For example, when the shaping functionality is face-lift, only the positions of key points on the chin and cheeks need to be moved toward the inside of the face, and the key points on the outermost contour in the triangulation template are not moved, which ensures that only a circle of the image on the circumference of the face is stretched and moved, the background image outside the outermost contour is not affected, and the influence of face shape adjustment on the image background is as small as possible, so that the result is as close to the real as possible. In this triangulation template, the purpose of the relatively tall forehead is to affect hair little when the forehead is moved up and down.

Figure 2B:
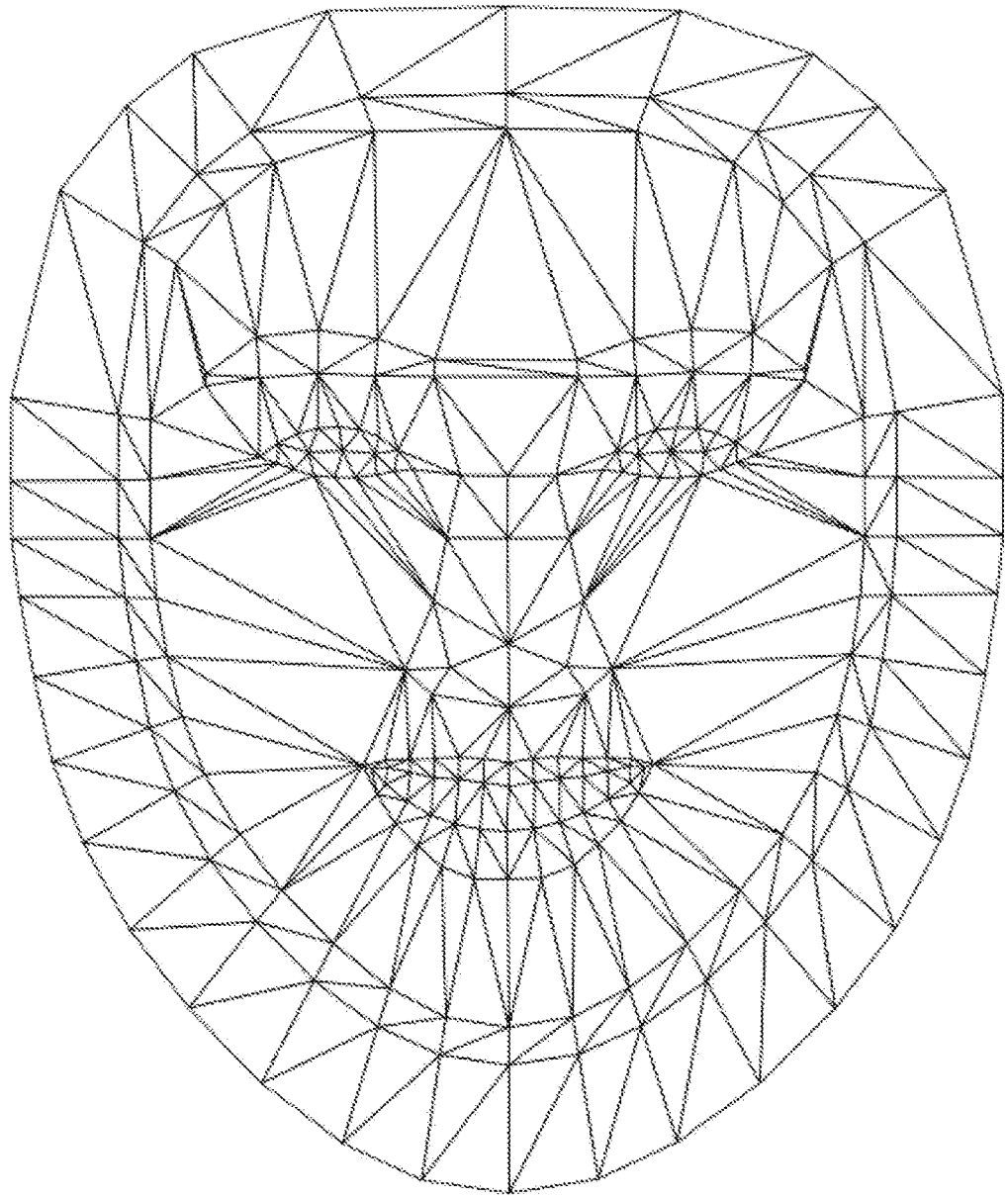
FIG. 2B is a schematic structural diagram of a triangulation template with a blush functionality according to Embodiment 1 of the present disclosure.

FIG. 2B is a schematic structural diagram of a triangulation template with a blush functionality according to Embodiment 1 of the present disclosure. As shown in FIG. 2B, in the triangulation template with the blush functionality, the division of cheek may be refined. This division may ensure that the tensile deformation of the blush is as small as possible in different cases of top view, bottom view, side face and the like.

Figure 2C:
FIG. 2C is a schematic structural diagram of a triangulation template with a pupil beautifying functionality according to Embodiment 1 of the present disclosure.

FIG. 2C is a schematic structural diagram of a triangulation template with a pupil beautifying functionality according to Embodiment 1 of the present disclosure. As shown in FIG. 2C, in the triangulation template with the pupil beautifying functionality, the division of pupils may be refined. This division may ensure that the tensile deformation of the pupils is as small as possible under different viewing angles.

Figure 2D:
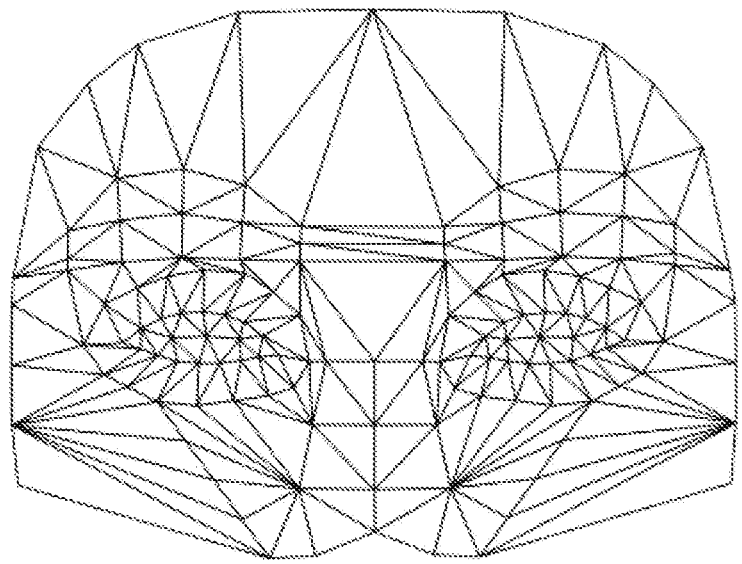
FIG. 2D is a schematic structural diagram of a triangulation template with an eye beautifying functionality according to Embodiment 1 of the present disclosure.

FIG. 2D is a schematic structural diagram of a triangulation template with an eye beautifying functionality according to Embodiment 1 of the present disclosure. As shown in FIG. 2D, in the triangulation template with the eye beautifying functionality, contours of eyes are expanded by one circle at the eyes, and eye makeup, such as "bedazzling eye makeup", may be drawn within the contour points. In addition, when the eyes are closed, the contours of the eyes are normally closed into a line, and the expanded eye contours may be unclosed through a program, which effectively ensures that the "bedazzling eye makeup" does not extend to the inside of the eyes when the eyes are closed, thereby ensuring that the "bedazzling eye makeup" is always displayed at corresponding positions under the eyes.

Figure 2E:
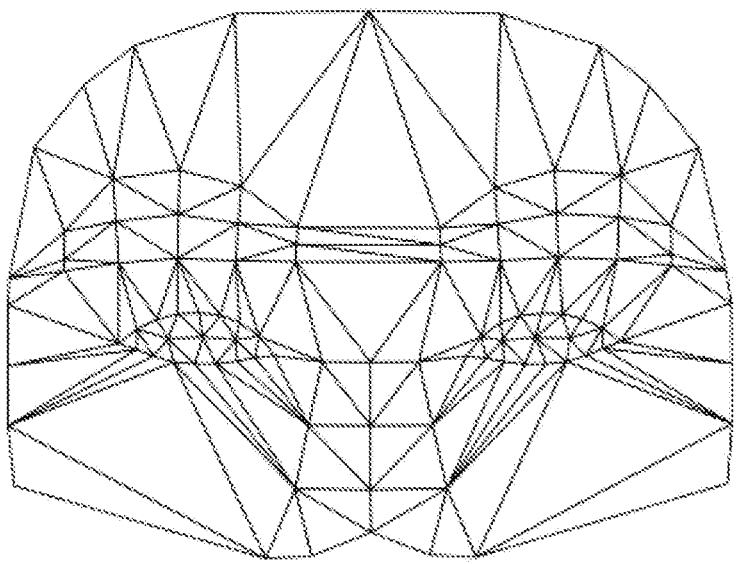
FIG. 2E is a schematic structural diagram of a triangulation template with an eyebrow beautifying functionality according to Embodiment 1 of the present disclosure.

FIG. 2E is a schematic structural diagram of a triangulation template with an eyebrow beautifying functionality according to Embodiment 1 of the present disclosure. As shown in FIG. 2E, in the triangulation template with the eyebrow beautifying functionality, a layer of key points are expanded on the eyebrows, and eyebrow materials may be drawn in the two eyebrow areas, thereby ensuring an enough space to draw eyebrows of any thickness and any complex shape.

Figure 2F:
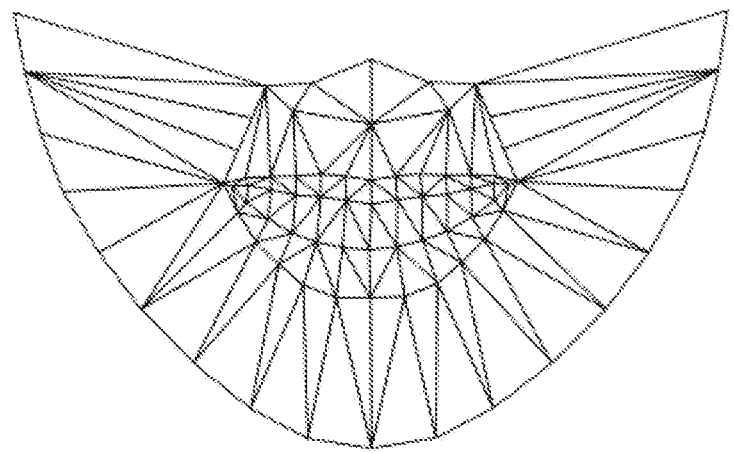
FIG. 2F is a schematic structural diagram of a triangulation template with a lip beautifying functionality according to Embodiment 1 of the present disclosure.

FIG. 2F is a schematic structural diagram of a triangulation template with a lip beautifying functionality according to Embodiment 1 of the present disclosure. As shown in FIG. 2F, in the triangulation template with the lip beautifying functionality, the division of lips may be refined to make up lip gloss or lipstick materials.

Figure 2G:
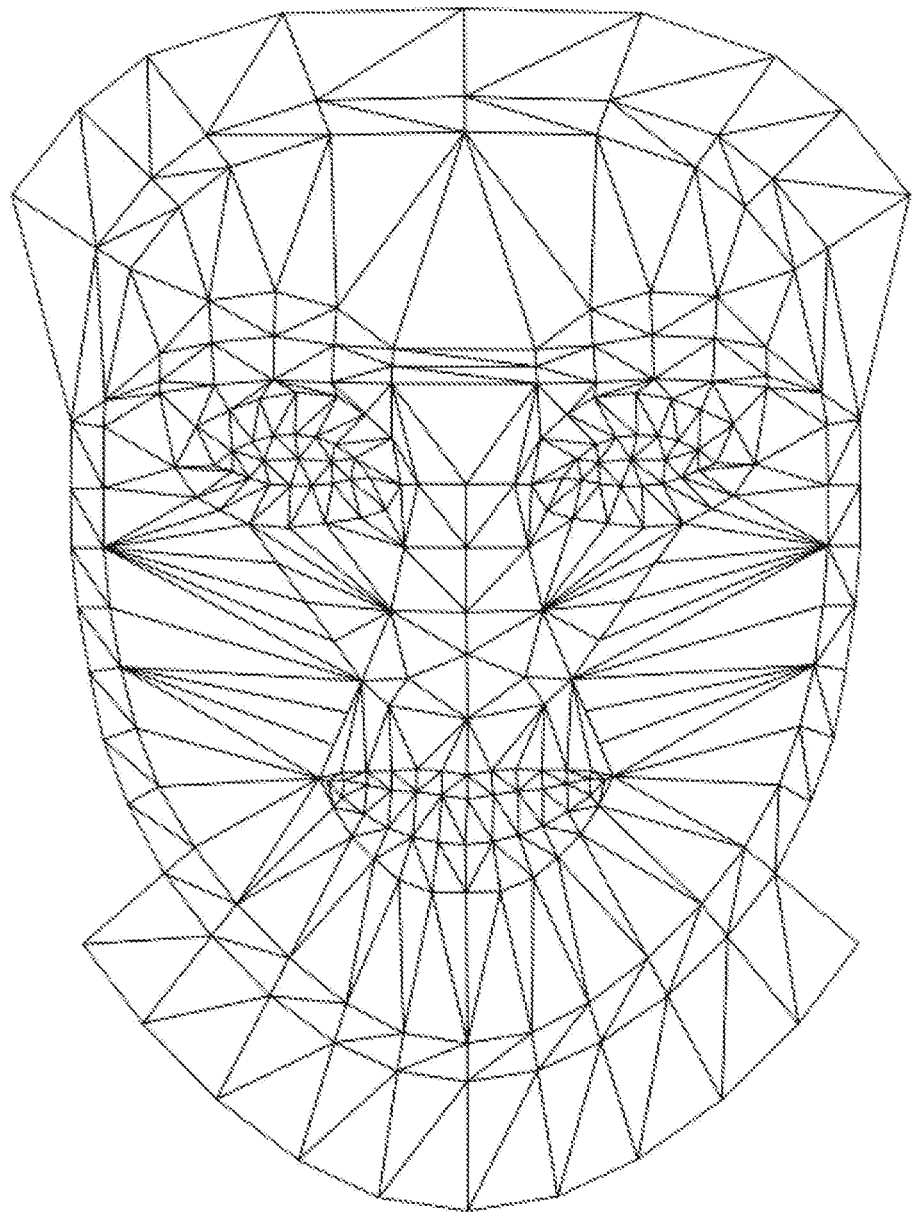
FIG. 2G is a schematic structural diagram of a triangulation template with a whitening and skin retouching functionality according to Embodiment 1 of the present disclosure.

FIG. 2G is a schematic structural diagram of a triangulation template with a whitening and skin retouching functionality according to Embodiment 1 of the present disclosure. As shown in FIG. 2G, the triangulation template with the whitening and skin retouching functionality may cover the skin area of the face, and a circle of key points are expanded in the forehead and neck areas, so that no matter the face in the video is in any case of pitching or side face, the triangulation template may accurately cover the skin area to achieve an accurate skin retouching effect in the skin area.

Optionally, in order to make the actual running result stable, smooth and true, the specific mode of triangulation needs to be consistent in the same video stream. As an example, a fixed triangulation template may be pre-stored, and after each frame of image or a key frame in the video is obtained, only the actual positions of vertices of triangulation grids need to be updated to obtain an image division result of the current processed frame, which also ensures the consistency of triangulation.

In the method for beautifying a face according to the embodiment of the present disclosure, a first predetermined number of key points are extracted from a current face image captured in advance, and a second predetermined number of key points are expanded in the current face image based on the first predetermined number of key points; then each preset key point is extracted from a triangulation template with a preset functionality, and a target key point corresponding to each preset key point is extracted from a set of key points consisting of the first predetermined number of key points and the second predetermined number of key points; each preset triangulation grid is extracted from the triangulation template based on each preset key point, and a target triangulation grid corresponding to each preset triangulation grid is constructed in the current face image based on each target key point; and finally, the current face image is beautified with the preset functionality on each target triangulation grid. That is, the present disclosure may preset a plurality of triangulation templates with different beautifying functionalities, use the triangulation templates corresponding to the beautifying functionalities for the different beautifying functionalities, construct target triangulation grids corresponding to the triangulation grids in the current face image, and perform beautifying with the corresponding functionality on the current face image on the target triangulation grids, thereby achieving the goals of improving the beautifying effect and improving the processing speed. In the existing method for beautifying a face, different beautifying functionalities are achieved by different technical means, so that different processing programs need to be installed and executed respectively, which causes the problem of slow processing speed; and the existing method for beautifying a face cannot achieve personalized beautifying effects. By the technical means of presetting the triangulation template, the present disclosure overcomes the technical problems in the existing technology that personalized beautifying effects cannot be achieved and the processing speed is slow, thereby achieving the personalized beautifying effects and improving the processing speed. In addition, the technical solution of the embodiment of the present disclosure is simple and convenient to implement, easy to popularize, and wider in application range.

Embodiment 2

Figure 3:
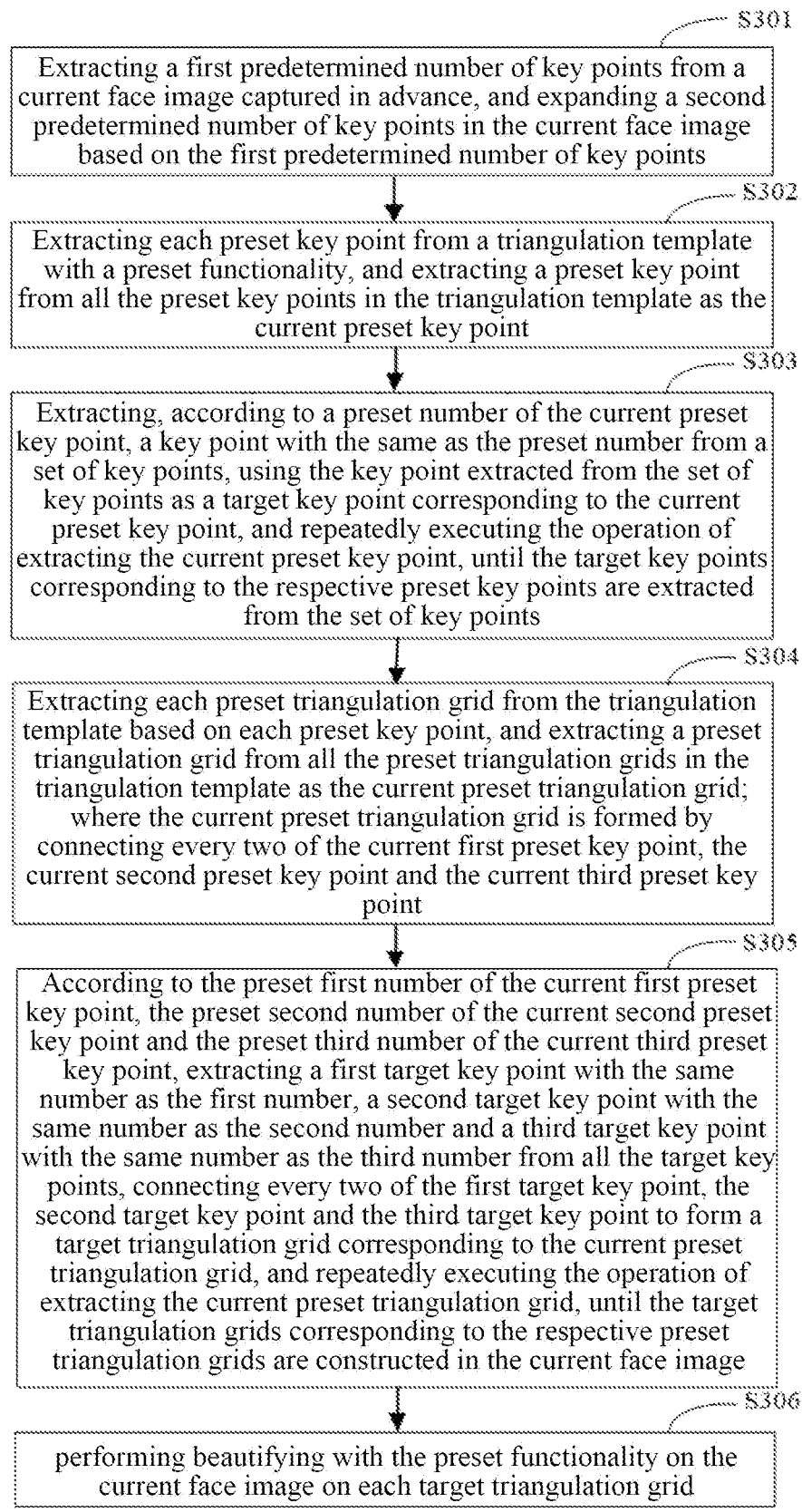
FIG. 3 is a schematic flowchart of a method for beautifying a face according to Embodiment 2 of the present disclosure.

FIG. 3 is a schematic flowchart of a method for beautifying a face according to Embodiment 2 of the present disclosure. As shown in FIG. 3, the method for beautifying a face may include the following steps.

S301, a first predetermined number of key points are extracted from a current face image captured in advance, and a second predetermined number of key points are expanded in the current face image based on the first predetermined number of key points.

In a specific embodiment of the present disclosure, the electronic device may extract the first predetermined number of key points from the current face image captured in advance, and expand the second predetermined number of key points in the current face image based on the first predetermined number of key points. The first predetermined number and the second predetermined number in the present disclosure may be preset. For example, the first predetermined number may be 190, and the second predetermined number may be 306. Then, a set of key points consisting of the first predetermined number of key points and the second predetermined number of key points includes 496 key points. In this step, the electronic device may set corresponding numbers on the key points extracted from the current face image, for example, number 1 to number 190; and the electronic device may also set corresponding numbers on the key points expanded in the current face image, for example, number 191 to number 496.

S302, each preset key point is extracted from a triangulation template with a preset functionality, and a preset key point is extracted from all the preset key points in the triangulation template as the current preset key point.

In a specific embodiment of the present disclosure, the electronic device may extract each preset key point from the triangulation template with the preset functionality, and extract a preset key point from all the preset key points in the triangulation template as the current preset key point. For example, the triangulation template with the preset functionality is assumed to include N preset key points, where N is a natural number greater than 1. In this step, the electronic device may extract a preset key point from the N preset key points as the current preset key point.

S303, according to a preset number of the current preset key point, a key point with the same number as the preset number is extracted from a set of key points, the key point extracted from the set of key points is used as a target key point corresponding to the current preset key point, and the operation of extracting the current preset key point is repeatedly executed, until the target key points corresponding to the respective preset key points are extracted from the set of key points.

In a specific embodiment of the present disclosure, the electronic device may extract, according to the preset number of the current preset key point, a key point with the same number from the set of key points, use the key point extracted from the set of key points as a target key point corresponding to the current preset key point, and repeatedly execute the operation of extracting the current preset key point, until the target key points corresponding to the respective preset key points are extracted from the set of key points. For example, the number of the current preset key point is assumed to be 1, and the electronic device may extract the key point numbered 1 from the set of key points as a target key point corresponding to the current preset key point.

The above embodiment has the following advantages or beneficial effects: the above embodiment extracts a preset key point from the triangulation template, and extracts a target key points with the same number from the set of key points, so that the target key points corresponding to the respective preset key points may be extracted from the set of key points.

S304, each preset triangulation grid is extracted from the triangulation template based on each preset key point, and a preset triangulation grid is extracted from all the preset triangulation grids in the triangulation template as the current preset triangulation grid. Here, the current preset triangulation grid is formed by connecting every two of the current first preset key point, the current second preset key point and the current third preset key point.

In a specific embodiment of the present disclosure, the electronic device may extract each preset triangulation grid from the triangulation template based on each preset key point, and extract a preset triangulation grid from all the preset triangulation grids in the triangulation template as the current preset triangulation grid; where the current preset triangulation grid is formed by connecting every two of the current first preset key point, the current second preset key point and the current third preset key point. For example, the triangulation template with the preset functionality is assumed to include M preset grids, where M is a natural number greater than 1. In this step, the electronic device may extract a preset triangulation grid from the M preset triangulation grids as the current preset triangulation grid.

S305, according to the preset first number of the current first preset key point, the preset second number of the current second preset key point and the preset third number of the current third preset key point, a first target key point with the same number as the first number, a second target key point with the same number as the second number and a third target key point with the same number as the third number are extracted from all the target key points, every two of the first target key point, the second target key point and the third target key point are connected to form a target triangulation grid corresponding to the current preset triangulation grid, and the operation of extracting the current preset triangulation grid is repeatedly executed, until the target triangulation grids corresponding to the respective preset triangulation grids are constructed in the current face image.

In a specific embodiment of the present disclosure, according to the preset first number of the current first preset key point, the preset second number of the current second preset key point and the preset third number of the current third preset key point, the electronic device may extract the first target key point with the same number as the first number, the second target key point with the same number as the second number and the third target key point with the same number as the third number from all the target key points, connect every two of the first target key point, the second target key point and the third target key point to form a target triangulation grid corresponding to the current preset triangulation grid, and repeatedly execute the operation of extracting the current preset triangulation grid, until the target triangulation grids corresponding to the respective preset triangulation grids are constructed in the current face image. For example, it is assumed that the number of the current first preset key point is 1, the number of the second preset key point is 2, and the number of the third preset key point is 3. In this step, the electronic device may extract the target key point numbered 1, the target key point numbered 2 and the target key point numbered 3 from all the target key points, and then connect every two of the target key point numbered 1, the target key point numbered 2 and the target key point numbered 3 to form a target triangulation grid corresponding to the current preset triangulation grid.

The above embodiment has the following advantages or beneficial effects: the above embodiment extracts each preset triangulation grid from the triangulation template, extracts a first target key point with the same number as the first number, a second target key point with the same number as the second number and a third target key point with the same number as the third number from all the target key points, and connects every two of the first target key point, the second target key point and the third target key point to form a target triangulation grid corresponding to the preset triangulation grid. Therefore, a target triangulation grid corresponding to each preset triangulation grid can be constructed in the current face image.

S306, the current face image is beautified with the preset functionality on each target triangulation grid.

In a specific embodiment of the present disclosure, the electronic device may perform beautifying with the preset functionality on the current face image on each target triangulation grid. Specifically, in response to the preset functionality being a shaping functionality, the electronic device may first determine a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and then the electronic device may perform beautifying with the shaping functionality on the current face image on each target triangulation grid according to the first position difference, the second position difference and the third position difference between the preset triangulation grids and the target triangulation grids corresponding to the preset triangulation grids.

The above embodiment has the following advantages or beneficial effects: for a shaping functionality, the above embodiment can perform beautifying with the shaping functionality on the current face image on each target triangulation grid according to the first position difference, the second position difference and the third position difference between the preset triangulation grids and the target triangulation grids corresponding to the preset triangulation grids.

In a specific embodiment of the present disclosure, in response to the preset functionality being a makeup functionality, the electronic device may acquire a makeup material corresponding to a vertex of each target triangulation grid; and then beautify, according to the makeup material corresponding to the vertex of each target triangulation grid, the current face image with the makeup functionality on each target triangulation grid. In response to the preset functionality being a whitening and skin retouching functionality, the electronic device may perform image space brightening on each target triangulation grid, extract each pixel from each target triangulation grid, and filter each extracted pixel.

The above embodiment has the following advantages or beneficial effects: for a makeup functionality, the current face image can be beautified with the makeup functionality on each target triangulation grid according to the makeup material corresponding to the vertex of each target triangulation grid; and for a whitening and skin retouching functionality, image space brightening is first performed on each target triangulation grid, then each pixel is extracted from each target triangulation grid, and each extracted pixel is filtered.

Specifically, for the shaping functionality, the position of the vertex of each target triangulation grid may be moved without modifying the texture corresponding to the vertex, so that global or local accurate shaping of the face may be achieved. For example, in an eye enlarging operation, the positions of target triangulation grids around the eyes need to be enlarged and moved with pupils of human eyes as centers, and the coordinate values of textures corresponding to the vertices of the target triangulation grids remain unchanged, so that the effect of enlarging the eyes may be achieved. For the makeup functionality, only vertex data of the customized triangulation template needs to be updated in time, and then a corresponding makeup material is searched for each triangulation vertex, so that seamless fit of the makeup effect may be achieved; and texture coordinates of the makeup material corresponding to each triangulation vertex may usually be pre-stored when the material is made. For the whitening and skin retouching functionality, the face area may be accurately covered, and then edge-preserving filtration is performed on the face area, thereby eliminating the output of the face area by a face segmentation algorithm and effectively improving the running speed. In this way, the present disclosure may be applied in the fields of short video, live video, film and television special effects. Compared with the existing art, this method has the following advantages: by introducing different triangulation templates for the functions of shaping, makeup, whitening and skin retouching, the advantages of the respective templates may be fully exerted, and the implementation effects of the functionalities are effectively improved.

In the method for beautifying a face according to the embodiment of the present disclosure, a first predetermined number of key points are extracted from a current face image captured in advance, and a second predetermined number of key points are expanded in the current face image based on the first predetermined number of key points; then each preset key point is extracted from a triangulation template with a preset functionality, and a target key point corresponding to each preset key point is extracted from a set of key points consisting of the first predetermined number of key points and the second predetermined number of key points; each preset triangulation grid is extracted from the triangulation template based on each preset key point, and a target triangulation grid corresponding to each preset triangulation grid is constructed in the current face image based on each target key point; and finally, the current face image is beautified with the preset functionality on each target triangulation grid. That is, the present disclosure may preset a plurality of triangulation templates with different beautifying functionalities, use the triangulation templates corresponding to the beautifying functionalities for the different beautifying functionalities, construct target triangulation grids corresponding to the triangulation grids in the current face image, and perform beautifying with the corresponding functionality on the current face image on the target triangulation grids, thereby achieving the goals of improving the beautifying effect and improving the processing speed. In the existing method for beautifying a face, different beautifying functionalities are achieved by different technical means, so that different processing programs need to be installed and executed respectively, which causes the problem of slow processing speed; and the existing method for beautifying a face cannot achieve personalized beautifying effects. By the technical means of presetting the triangulation template, the present disclosure overcomes the technical problems in the existing art that personalized beautifying effects cannot be achieved and the processing speed is slow, thereby achieving the personalized beautifying effects and improving the processing speed. In addition, the technical solution of the embodiment of the present disclosure is simple and convenient to implement, easy to popularize, and wider in application range.

Embodiment 3

Figure 4:
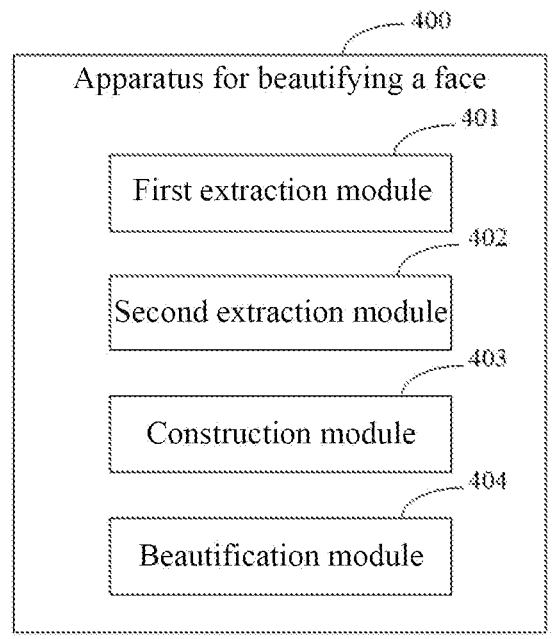
FIG. 4 is a schematic structural diagram of an apparatus for beautifying a face according to Embodiment 3 of the present disclosure.

FIG. 4 is a schematic structural diagram of an apparatus for beautifying a face according to Embodiment 3 of the present disclosure. As shown in FIG. 4, the apparatus 400 includes: a first extraction module 401, a second extraction module 402, a construction module 403, and a beautification module 404.

The first extraction module 401 is configured to extract a first predetermined number of key points from a current face image captured in advance, and expand a second predetermined number of key points in the current face image based on the first predetermined number of key points.

The second extraction module 402 is configured to extract each preset key point from a triangulation template with a preset functionality, and extract a target key point corresponding to each preset key point from a set of key points consisting of the first predetermined number of key points and the second predetermined number of key points.

The construction module 403 is configured to extract each preset triangulation grid from the triangulation template based on each preset key point, and construct a target triangulation grid corresponding to each preset triangulation grid in the current face image based on each target key point.

The beautification module 404 is configured to perform beautifying with the preset functionality on the current face image on each target triangulation grid.

Further, the preset functionality at least includes: a shaping functionality, a makeup functionality, and a whitening and skin retouching functionality. The makeup functionality includes: a whole face makeup functionality, an upper half face makeup functionality, and a lower half face makeup functionality.

Further, the second extraction module 402 is specifically configured to extract a preset key point from all the preset key points in the triangulation template as a current preset key point; and extract, according to a preset number of the current preset key point, a key point with the same number as the preset number from the set of key points, use the key point extracted from the set of key points as a target key point corresponding to the current preset key point, and repeatedly execute the operation of extracting the current preset key point, until the target key points corresponding to the respective preset key points are extracted from the set of key points.

Further, the construction module 403 is specifically configured to: extract a preset triangulation grid from all the preset triangulation grids in the triangulation template as the current preset triangulation grid, where the current preset triangulation grid is formed by connecting every two of a current first preset key point, a current second preset key point and a current third preset key point; and according to the preset first number of the current first preset key point, the preset second number of the current second preset key point and the preset third number of the current third preset key point, extract a first target key point with the same number as the first number, a second target key point with the same number as the second number and a third target key point with the same number as the third number from all the target key points, connect every two of the first target key point, the second target key point and the third target key point to form a target triangulation grid corresponding to the current preset triangulation grid, and repeatedly execute the operation of extracting the current preset triangulation grid, until the target triangulation grids corresponding to the respective preset triangulation grids are constructed in the current face image.

Further, the beautification module 404 is specifically configured to determine, in response to the preset functionality being a shaping functionality, a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and perform beautifying with the shaping functionality on the current face image on each target triangulation grid according to the first position difference, the second position difference and the third position difference between the preset triangulation grids and the target triangulation grids corresponding to the preset triangulation grids.

Further, the beautification module 404 is specifically configured to acquire, in response to the preset functionality being the makeup functionality, a makeup material corresponding to a vertex of each target triangulation grid, and perform beautifying with the makeup functionality on the current face image on each target triangulation grid, according to the makeup material corresponding to the vertex of each target triangulation grid; or perform, in response to the preset functionality being the whitening and skin retouching functionality, image space brightening on each target triangulation grid, extract each pixel from each target triangulation grid, and filter each extracted pixel.

The aforementioned apparatus for beautifying a face may execute the method according to any embodiment of the present disclosure, and has corresponding functionality modules for executing the method and corresponding beneficial effects. For technical details not described in this embodiment, reference may be made to the method for beautifying a face according to any embodiment of the present disclosure.

Embodiment 4

According to an embodiment of the present disclosure, an electronic device and a readable storage medium are further provided.

Figure 5:
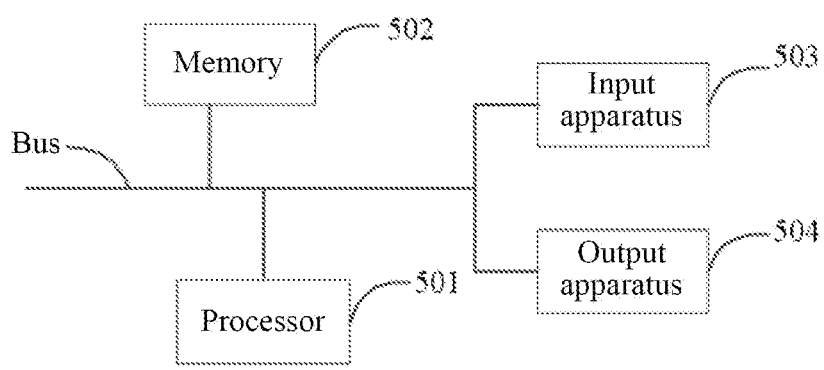
FIG. 5 is a block diagram of an electronic device used to implement the method for beautifying a face according to embodiments of the present disclosure.

As shown in FIG. 5, which is a block diagram of an electronic device of a method for beautifying a face according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 5, the electronic device includes: one or more processors 501, a memory 502, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 5, one processor 501 is used as an example.

The memory 502 is a non-transitory computer readable storage medium provided by an embodiment of the present disclosure. The memory stores instructions executable by at least one processor, so that the at least one processor performs the method for beautifying a face provided by an embodiment of the present disclosure. The non-transitory computer readable storage medium of an embodiment of the present disclosure stores computer instructions for causing a computer to perform the method for beautifying a face provided by the embodiment of the present disclosure.

The memory 502, as a non-transitory computer readable storage medium, may be used to store non-transitory software programs, non-transitory computer executable programs and modules, such as program instructions/modules corresponding to the method for beautifying a face in the embodiments of the present disclosure (for example, the first extraction module 401, and the second extraction module 402, the construction module 403, and the beautification module 404 shown in FIG. 4). The processor 501 executes the non-transitory software programs, instructions, and modules stored in the memory 602 to execute various functional applications and data processing of the server, that is, to implement the method for beautifying a face in the foregoing method embodiment.

The memory 502 may include a storage program area and a storage data area, where the storage program area may store an operating system and at least one function required application program; and the storage data area may store data created by the use of the electronic device according to the method for processing parking, etc. In addition, the memory 502 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for processing parking through a network. Examples of the above network include but are not limited to the Internet, intranet, local area network, mobile communication network, and combinations thereof.

The electronic device of the method for processing an image may further include: an input apparatus 503 and an output apparatus 504. The processor 501, the memory 502, the input apparatus 503, and the output apparatus 504 may be connected through a bus or in other methods. In FIG. 5, connection through a bus is used as an example.

The input apparatus 503 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 504 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

According to the technical solution provided by embodiments of the disclosure, a first predetermined number of key points are extracted from a current face image captured in advance, and a second predetermined number of key points are expanded in the current face image based on the first predetermined number of key points; then each preset key point is extracted from a triangulation template with a preset functionality, and a target key point corresponding to each preset key point is extracted from a set of key points consisting of the first predetermined number of key points and the second predetermined number of key points; each preset triangulation grid is extracted from the triangulation template based on each preset key point, and a target triangulation grid corresponding to each preset triangulation grid is constructed in the current face image based on each target key point; and finally, the current face image is beautified with the preset functionality on each target triangulation grid. That is, the present disclosure can preset a plurality of triangulation templates with different beautifying functionalities, use the triangulation templates corresponding to the beautifying functionalities for the different beautifying functionalities, construct target triangulation grids corresponding to the triangulation grids in the current face image, and perform beautifying with the corresponding functionality on the current face image on the target triangulation grids, thereby achieving the goals of improving the beautifying effect and improving the processing speed. In the existing method for beautifying a face, different beautifying functionalities are achieved by different technical means, so that different processing programs need to be installed and executed respectively, which causes the problem of slow processing speed; and the existing method for beautifying a face cannot achieve personalized beautifying effects. By the technical means of presetting the triangulation template, the present disclosure overcomes the technical problems in the existing art that personalized beautifying effects cannot be achieved and the processing speed is slow, thereby achieving the personalized beautifying effects and improving the processing speed. In addition, the technical solutions of the embodiments of the present disclosure are simple and convenient to implement, easy to popularize, and wider in application range.

It is to be understood that the steps of reordering, adding or deleting may be performed using the various forms shown above. For example, the steps described in the present disclosure may be performed in parallel or sequentially or in a different order, so long as the desired results of the technical solution disclosed in the present disclosure may be realized, and no limitation is imposed herein.

The foregoing detailed description is not intended to limit the scope of the present disclosure. It will be appreciated by those skilled in the art that various modifications, combinations, sub-combinations, and substitutions may be made depending on design requirements and other factors. Any modifications, equivalents, and modifications that fall within the spirit and principles of the present disclosure are intended to be included within the scope of the present disclosure.

What is claimed is:

1. A method for beautifying a face, the method comprising:
   extracting a first predetermined number of key points from a current face image captured in advance, and expanding a second predetermined number of key points in the current face image based on the first predetermined number of key points;
   extracting each preset key point from a triangulation template with a preset functionality, and extracting a target key point corresponding to each preset key point from a set of key points consisting of the first predetermined number of key points and the second predetermined number of key points;
   extracting each preset triangulation grid from the triangulation template based on each preset key point, and constructing a target triangulation grid corresponding to each preset triangulation grid in the current face image based on each target key point; and
   performing beautifying with the preset functionality on the current face image on each target triangulation grid.

2. The method according to claim 1, wherein the preset functionality at least comprises: a shaping functionality, a makeup functionality, and a whitening and skin retouching functionality; and the makeup functionality comprises: a whole face makeup functionality, an upper half face makeup functionality, and a lower half face makeup functionality.

3. The method according to claim 2, wherein performing beautifying with the preset functionality on the current face image on each target triangulation grid comprises:
   in response to the preset functionality being the shaping functionality, determining a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and
   performing beautifying with the shaping functionality on the current face image on each target triangulation grid according to the first position difference, the second position difference and the third position difference between the preset triangulation grids and the target triangulation grids corresponding to the preset triangulation grids.

4. The method according to claim 2, wherein performing beautifying with the preset functionality on the current face image on each target triangulation grid comprises:
   in response to the preset functionality being the makeup functionality, acquiring a makeup material corresponding to a vertex of each target triangulation grid, and performing beautifying with the makeup functionality on the current face image on each target triangulation grid, according to the makeup material corresponding to the vertex of each target triangulation grid, or in response to the preset functionality being the whitening and skin retouching functionality, performing image space brightening on each target triangulation grid, extracting each pixel from each target triangulation grid, and filtering each extracted pixel.

5. The method according to claim 1, wherein extracting the target key point corresponding to each preset key point from the set of key points consisting of the first predetermined number of key points and the second predetermined number of key points comprises:

extracting a preset key point from all preset key points in the triangulation template as a current preset key point; and extracting, according to a preset number of the current preset key point, a key point with a same number as the preset number from the set of key points, using the key point extracted from the set of key points as a target key point corresponding to the current preset key point, and repeatedly executing the operation of extracting the current preset key point, until target key points corresponding to respective preset key points are extracted from the set of key points.

6. The method according to claim 1, wherein constructing the target triangulation grid corresponding to each preset triangulation grid in the current face image based on each target key point comprises:

extracting a preset triangulation grid from all preset triangulation grids in the triangulation template as a current preset triangulation grid; wherein the current preset triangulation grid is formed by connecting every two of a current first preset key point, a current second preset key point and a current third preset key point; and according to a preset first number of the current first preset key point, a preset second number of the current second preset key point and a preset third number of the current third preset key point, extracting a first target key point with a same number as the first number, a second target key point with a same number as the second number and a third target key point with a same number as the third number from all target key points, connecting every two of the first target key point, the second target key point and the third target key point to form a target triangulation grid corresponding to the current preset triangulation grid, and repeatedly executing the operation of extracting the current preset triangulation grid, until target triangulation grids corresponding to respective preset triangulation grids are constructed in the current face image.

7. An electronic device comprising:
at least one processor; and
a memory communicatively connected with the at least one processor;
wherein the memory stores instructions executable by the at least one processor, and the instructions, when executed by the at least one processor, cause the at least one processor to execute operations, the operations comprising:
extracting a first predetermined number of key points from a current face image captured in advance, and expanding a second predetermined number of key points in the current face image based on the first predetermined number of key points;
extracting each preset key point from a triangulation template with a preset functionality, and extracting a target key point corresponding to each preset key point from a set of key points consisting of the first predetermined number of key points and the second predetermined number of key points;
extracting each preset triangulation grid from the triangulation template based on each preset key point, and constructing a target triangulation grid corresponding to each preset triangulation grid in the current face image based on each target key point; and
performing beautifying with the preset functionality on the current face image on each target triangulation grid.

8. The electronic device according to claim 7, wherein the preset functionality at least comprises: a shaping functionality, a makeup functionality, and a whitening and skin retouching functionality; and the makeup functionality comprises: a whole face makeup functionality, an upper half face makeup functionality, and a lower half face makeup functionality.

9. The electronic device according to claim 8, wherein performing beautifying with the preset functionality on the current face image on each target triangulation grid comprises:

in response to the preset functionality being the shaping functionality, determining a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and performing beautifying with the shaping functionality on the current face image on each target triangulation grid according to the first position difference, the second position difference and the third position difference between the preset triangulation grids and the target triangulation grids corresponding to the preset triangulation grids.

10. The electronic device according to claim 8, wherein performing beautifying with the preset functionality on the current face image on each target triangulation grid comprises:

in response to the preset functionality being the makeup functionality, acquiring a makeup material corresponding to a vertex of each target triangulation grid, and performing beautifying with the makeup functionality on the current face image on each target triangulation grid, according to the makeup material corresponding to the vertex of each target triangulation grid, or in response to the preset functionality being the whitening and skin retouching functionality, performing image space brightening on each target triangulation grid, extracting each pixel from each target triangulation grid, and filtering each extracted pixel.

11. The electronic device according to claim 7, wherein extracting the target key point corresponding to each preset key point from the set of key points consisting of the first predetermined number of key points and the second predetermined number of key points comprises:

extracting a preset key point from all preset key points in the triangulation template as a current preset key point; and extracting, according to a preset number of the current preset key point, a key point with a same number as the preset number from the set of key points, using the key point extracted from the set of key points as a target key point corresponding to the current preset key point, and repeatedly executing the operation of extracting the current preset key point, until target key points corresponding to respective preset key points are extracted from the set of key points.

12. The electronic device according to claim 7, wherein constructing the target triangulation grid corresponding to each preset triangulation grid in the current face image based on each target key point comprises:

extracting a preset triangulation grid from all preset triangulation grids in the triangulation template as a current preset triangulation grid; wherein the current preset triangulation grid is formed by connecting every two of a current first preset key point, a current second preset key point and a current third preset key point; and according to a preset first number of the current first preset key point, a preset second number of the current second preset key point and a preset third number of the current third preset key point, extracting a first target key point with a same number as the first number, a second target key point with a same number as the second number and a third target key point with a same number as the third number from all target key points, connecting every two of the first target key point, the second target key point and the third target key point to form a target triangulation grid corresponding to the current preset triangulation grid, and repeatedly executing the operation of extracting the current preset triangulation grid, until target triangulation grids corresponding to respective preset triangulation grids are constructed in the current face image.

13. A non-transitory computer-readable storage medium storing computer instructions, wherein the computer instructions, when executed by a computer, cause the computer to execute operations, the operations comprising:

extracting a first predetermined number of key points from a current face image captured in advance, and expanding a second predetermined number of key points in the current face image based on the first predetermined number of key points;

extracting each preset key point from a triangulation template with a preset functionality, and extracting a target key point corresponding to each preset key point from a set of key points consisting of the first predetermined number of key points and the second predetermined number of key points;

extracting each preset triangulation grid from the triangulation template based on each preset key point, and constructing a target triangulation grid corresponding to each preset triangulation grid in the current face image based on each target key point; and performing beautifying with the preset functionality on the current face image on each target triangulation grid.

14. The non-transitory computer-readable storage medium according to claim 13, wherein the preset functionality at least comprises: a shaping functionality, a makeup functionality, and a whitening and skin retouching functionality; and the makeup functionality comprises: a whole face makeup functionality, an upper half face makeup functionality, and a lower half face makeup functionality.

15. The non-transitory computer-readable storage medium according to claim 14, wherein performing beautifying with the preset functionality on the current face image on each target triangulation grid comprises:

in response to the preset functionality being the shaping functionality, determining a first position difference between the first preset key point in each preset triangulation grid and the first target key point in the target triangulation grid corresponding to each preset triangulation grid, a second position difference between the second preset key point in each preset triangulation grid and the second target key point in the target triangulation grid corresponding to each preset triangulation grid, and a third position difference between the third preset key point in each preset triangulation grid and the third target key point in the target triangulation grid corresponding to each preset triangulation grid; and performing beautifying with the shaping functionality on the current face image on each target triangulation grid according to the first position difference, the second position difference and the third position difference between the preset triangulation grids and the target triangulation grids corresponding to the preset triangulation grids.

16. The non-transitory computer-readable storage medium according to claim 14, wherein performing beautifying with the preset functionality on the current face image on each target triangulation grid comprises:

in response to the preset functionality being the makeup functionality, acquiring a makeup material corresponding to a vertex of each target triangulation grid, and performing beautifying with the makeup functionality on the current face image on each target triangulation grid, according to the makeup material corresponding to the vertex of each target triangulation grid, or in response to the preset functionality being the whitening and skin retouching functionality, performing image space brightening on each target triangulation grid, extracting each pixel from each target triangulation grid, and filtering each extracted pixel.

17. The non-transitory computer-readable storage medium according to claim 13, wherein extracting the target key point corresponding to each preset key point from the set of key points consisting of the first predetermined number of key points and the second predetermined number of key points comprises:

extracting a preset key point from all preset key points in the triangulation template as a current preset key point; and extracting, according to a preset number of the current preset key point, a key point with a same number as the preset number from the set of key points, using the key point extracted from the set of key points as a target key point corresponding to the current preset key point, and repeatedly executing the operation of extracting the current preset key point, until target key points corresponding to respective preset key points are extracted from the set of key points.

18. The non-transitory computer-readable storage medium according to claim 13, wherein constructing the target triangulation grid corresponding to each preset triangulation grid in the current face image based on each target key point comprises:

extracting a preset triangulation grid from all preset triangulation grids in the triangulation template as a current preset triangulation grid; wherein the current preset triangulation grid is formed by connecting every two of a current first preset key point, a current second preset key point and a current third preset key point; and according to a preset first number of the current first preset key point, a preset second number of the current second preset key point and a preset third number of the current third preset key point, extracting a first target key point with a same number as the first number, a second target key point with a same number as the second number and a third target key point with a same number as the third number from all target key points, connecting every two of the first target key point, the second target key point and the third target key point to form a target triangulation grid corresponding to the current preset triangulation grid, and repeatedly executing the operation of extracting the current preset triangulation grid, until target triangulation grids corresponding to respective preset triangulation grids are constructed in the current face image.

* * * * *